(No Model.) 2 Sheets—Sheet 2.
J. A. ADAMS.
STEAM, AIR, OR WATER ENGINE.
No. 257,452. Patented May 9, 1882.
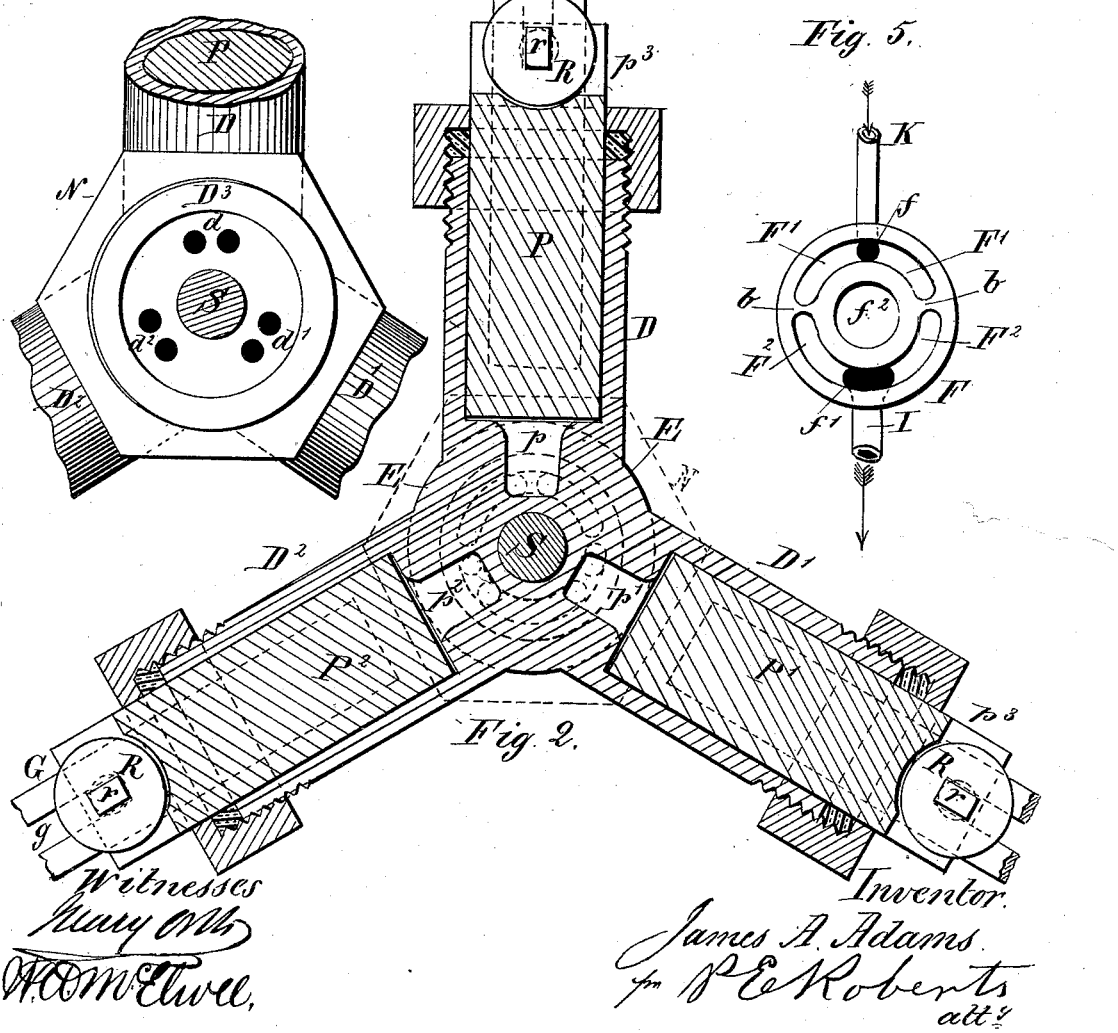

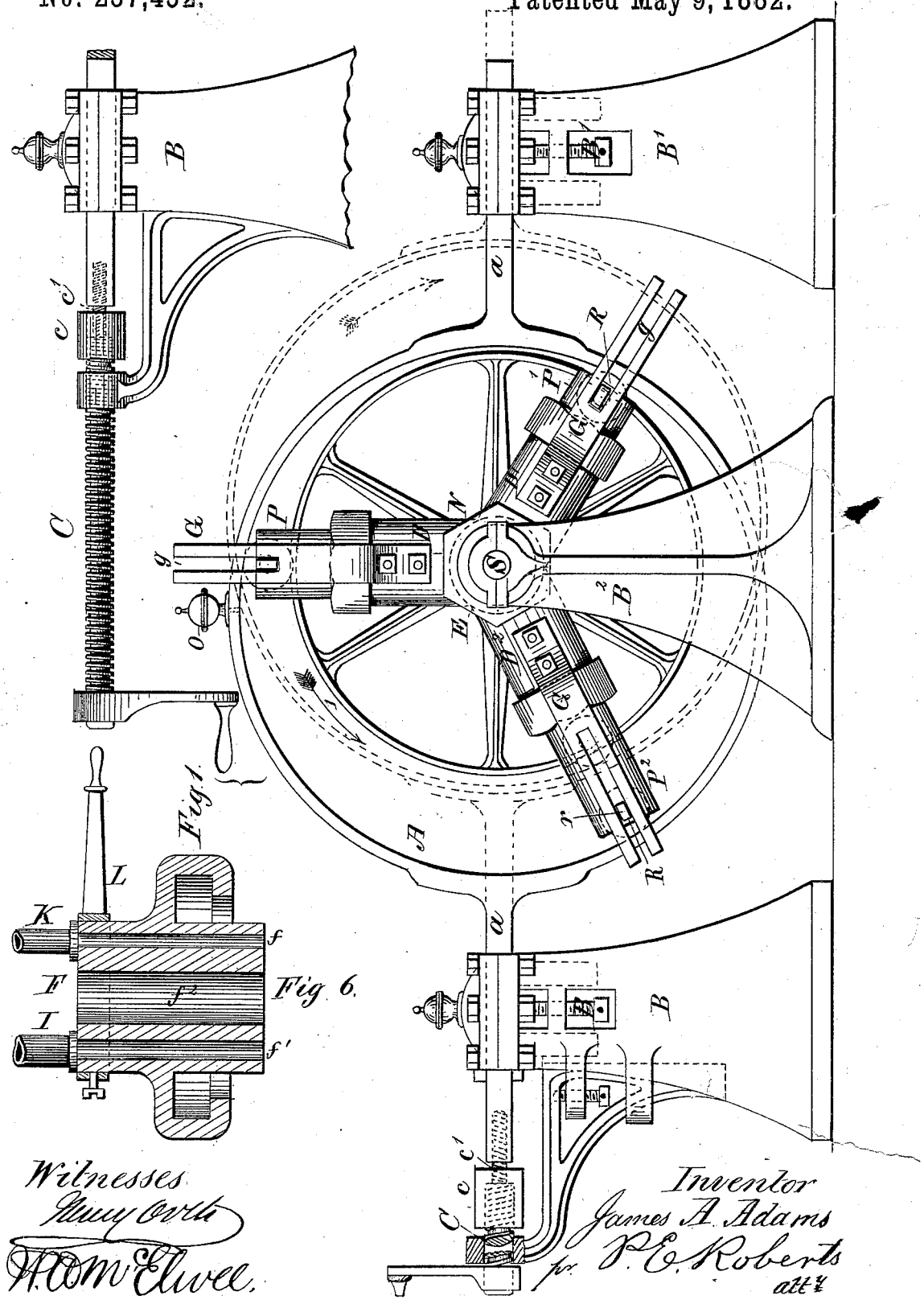

UNITED STATES PATENT OFFICE.

JAMES A. ADAMS, OF AUSTIN, TEXAS, ASSIGNOR OF ONE-HALF TO PETER E. ROBERTS, OF SAME PLACE.

STEAM, AIR, OR WATER ENGINE.

SPECIFICATION forming part of Letters Patent No. 257,452, dated May 9, 1882.

Application filed October 14, 1881. (No model.)

*To all whom it may concern:*

Be it known that I, JAMES A. ADAMS, a citizen of the United States, residing at Austin, in the county of Travis, in the State of Texas, have invented a certain new and useful Engine, to be operated by steam, air, or water; and I do hereby declare the following to be a full, clear, and exact description of the invention, such as will enable others skilled in the art to which it appertains to make and use the same, reference being had to accompanying drawings, and to the letters or figures of reference marked thereon, which form a part of this specification.

My invention has for its object to simplify the construction of steam-engines, and to economically apply and utilize the power of steam or other expansive gas or vapor or air.

The further object of the invention is to adapt the engine to work in any position, whether vertical, horizontal, or inclined, or in any position in which a driving-shaft may be placed, and to adapt it for use as a motor for driving machinery of any description, or for driving vehicles or vessels.

The principle upon which this invention is based is the result obtained by the exertion of the power of two antagonistic forces in a direction not at right angles to or in the plane of each other. Under such conditions a weaker inert force may not only successfully resist a more powerful moving force, but may compel the latter to move in a direction diametrically opposite to that in which its power is exerted. For instance, if we take a wheeled truck carrying a piston-cylinder the piston of which is arranged to move at right angles to the plane of the truck, what will be the result if the piston is projected from its cylinder by a suitable power—such as steam—and brought in contact with an inert resisting-surface not at right angles to or in the plane of motion of said piston? The result will be that instead of the *vis viva* moving the inertia the latter will move the former or cause it to move in the direction of least resistance, or at right angles to the plane of motion of the piston, or in the plane of motion of the truck. This movement will continue so long as the piston exerts its power upon the inclined resisting-surface. If the direction of the inclination of the resisting force is reversed as soon as the truck has traveled the length thereof, the direction of motion of the truck is also reversed.

Instead of mounting the piston-cylinder on a truck, if it were mounted on slideways and provided with a piston on its opposite sides, exerting their power alternately against two resisting-surfaces inclined in opposite directions, a rectilinear reciprocating motion of the piston would be the result, as will be readily understood.

First. The power being exerted in a direction of constantly-decreasing resistance, the friction is reduced to a minimum.

Second. There is no need of valves or valve-motions, except the usual throttle-valve on the feed-pipe.

Third. The reversal of the direction of motion is effected by reversing the direction of the inclined plane.

Fourth. There is no need of a governor, the engine acting as such to regulate its speed, when this exceeds certain limits.

Fifth. The centrifugal force is made an available power to assist in driving the engine.

Sixth. The stroke of the piston is regulated by varying the degree of inclination of the inclined plane, and through it the speed of the engine.

Seventh. The engine may be stopped without cutting off the steam by causing the antagonizing forces to exert their power in a direction at right angles to each other.

Eighth. As there are no dead-centers there is no loss of power to overcome, as is the case in the ordinary reciprocating-piston engine.

Ninth. The engine is adapted to work in any position a driving-shaft may be made to assume, and such shaft may be actuated by more than one of such engines; and, lastly, the engine is compact and solid, and as compared with other classes of engines it is composed of a comparatively limited number of parts, and these are all of the simplest form, requiring but little finishing or trueing.

Having fully set forth the object of the invention, its nature, the principles upon which it is based, and some of the more important results obtained, I will now describe the means preferably adopted to practically carry out the invention, which consists, first, in the method of subjecting the entire surface of the plane of resistance to equal wear by adjusting the same both horizontally and vertically relatively to the axis of rotation of the forces acting upon said plane and correspondingly adjusting the admission and exhaust of the power impelling said forces, whereby the position of the working-surface of the plane of resistance is shifted relatively to the forces acting thereon, substantially as set forth; second, in the construction, combination, and co-operation of the parts or elements by means of which rectilinear motion is practically converted into continuous rotary motion and made available as a motor, as fully described hereinafter.

In the accompanying two sheets of drawings, Figure 1 is a side elevation of my improved motor. Fig. 2 is a vertical longitudinal section of the piston-cylinder and supporting-shaft. Fig. 3 is a horizontal transverse section of part of the same and the steam-chest. Fig. 4 is a front elevation of the piston-cylinder, the steam-chest being removed to show the steam-ports in the former; and Fig. 5 is an end elevation of the steam-chest, showing the steam passages and ports. Fig. 6 shows in section a slight modification of the steam-chest.

In the above figures of drawings like letters of reference indicate like parts.

The engine is composed of the following elements, to wit: of a circular band or hoop, A, adjustably supported in suitable bearings, B B', of a driving-shaft, S, supported and rotating in suitable bearings, $B^2$, and of a cylindrical casing, E, secured upon said shaft.

The cylinder or casting E has, preferably, three piston-cylinders, D D' $D^2$, arranged equidistant from each other around its periphery, and a cylinder, $D^3$, on a line with its axis for the reception of a cylindrical steam-chest, F. The end wall of the cylinder, $D^3$, has steam-ports $d$ $d'$ $d^2$, that communicate respectively with steam-passages $p$ $p'$ $p^2$, through which steam is admitted to and exhausted from the piston-cylinders D D' $D^2$. The latter cylinders contain each a piston, P P' $P^2$, respectively provided at their ends with bearings $p^3$, for the trunnions $r$ of the rollers R. The pistons are guided in their movements toward and from the ring A by guides G, the ends of the trunnions $r$ (which are preferably square) projecting into slots $g$ of said guides, as plainly shown in Fig. 1.

The steam-chest F has a central aperture, $f^2$, through which passes the shaft S and within which said shaft rotates. The steam-chest is fitted within the casing $D^3$ of the cylinder E, and has two steam-passages, $f$ $f'$, diametrically opposite each other. One end of the passage $f$ is connected with the boiler-pipe K, and one end of the passage $f'$ is connected with the exhaust-pipe I. The opposite end of the passage $f$ terminates in a segmental port, F', formed in the end face of the steam-chest, and extends in opposite directions from the passage $f$ to a point in close proximity to the horizontal plane of the steam-chest. The opposite end of the exhaust-steam passage terminates in a like segmental port, $F^2$, the ends of which are made to slightly overlap the horizontal plane of the chest, leaving a narrow bridge, $b$, between the extremities of the two ports.

The pistons, as well as the steam-chest, work steam-tight in their respective cylinders or casings. The means employed for this purpose may be such as shown in the drawings, or any of the approved or preferred devices usually employed for packing the piston and valve rods of steam-engines.

The pistons P P' $P^2$ are preferably made of a solid piece of metal, for the reason that their weight can be made available as a power to assist the cylinder E and shaft S in their rotation. Any other form of piston may, however, be employed, and their number may be increased and even decreased, though the latter is not advisable, for the reason that the rotary motion then obtained will not be a uniform one. The length of the pistons P P' $P^2$ is such that when the center of the band A is made to coincide with the center of the shaft S each piston-roller can be brought in contact with the inner periphery of the band. In other words, the distance from the center of the shaft S to the extremity of the roller R when its piston is fully drawn out is equal to one-half of the diameter of the hoop or ring A.

The operation of the engine is as follows: The ring A being adjusted so that its center will not coincide with that of the shaft S, the upper half of the inner periphery of the ring, as shown in Fig. 1, will form an inclined plane that gradually recedes from said shaft from right to left, while the lower half of the inner periphery of the band will form an inclined plane that gradually approaches the shaft in a reverse direction, or from left to right. If the cylinder E is in the position shown in said figure, the port $d$ and passage $p$ of the piston-cylinder D will be opposite the passage $f$ of the steam-chest. Steam being now admitted by opening the throttle-valve on the boiler-pipe, said steam will rush through $f$ $d$ $p$ into D and drive the piston P out until its rectilinear movement is arrested by the ring A. It is evident that if the center of the ring and that of the shaft S were coincident to each other either the ring A would be forced out of the way by the piston or the rectilinear motion of the latter would be arrested, and if the strength of either is such as to resist the power of the steam the engine will remain stationary; but inasmuch as the center of the ring A does not coincide with the center of the shaft S, it being eccentric thereto, the upper half of the inner periphery of the band or ring forms an inclined plane that gradually recedes from the shaft and its piston from right to left, as above set forth. The power exerted by the piston-roller R will be in a tangential direction, and the piston will slip from under the band; but as the steam continues to impel the piston in a rectilinear direction, it will continue to slip from under the band more and more rapidly as the resistance decreases, until said piston reaches the point where the inclined plane formed by the inner periphery of the band commences to approach the shaft. If the steam were allowed to continue to exert its power, and but one piston used, a stoppage would take place, because at that point the resistance of the band will be exerted in a direction coincident with the plane of rectilinear motion of the piston. However, before the roller of the piston P reaches the point where the inclined plane commences to approach the shaft S the port $d$ will have passed the extremity of the port F' of the steam-chest and the steam will be cut off from cylinder D, and before the said port $d$ reaches the extremity of the exhaust-port F² the piston P will still be acted upon by the expansion of the steam within the cylinder D, by means of which it is carried over the space $b$, intervening between the left extremities of the feed-port F' and the exhaust-port F². Before the piston P has reached the left extremity of the feed-port F' the piston-cylinder D' will have passed over the right extremity of said feed-port. Steam will now be admitted to the cylinder D' also, and the roller of its piston P' will exert its power against the band A at a point where the receding inclined plane commences, or nearly so, and, like piston P, it will move in the direction of least resistance—that is to say, in the same direction as the piston P. When the piston P' is about to reach the left extremity of the feed-port F' the piston P² will be in position to be projected by the steam entering the cylinder D², and so on, thus converting rectilinear into continuous rotary motion. As the pistons move in the direction of least resistance, or in that direction in which the inclined plane is receding from the shaft S, said pistons are projected out of their cylinders in proportion to the degree of inclination of the plane A. The weight, therefore, of each piston increases in proportion as it is forced out, thus aiding and accelerating their movement; and when the pistons travel over the receding part of the inclined plane they are moved inward into their cylinders, and their weight is consequently diminished. Thus the added power from the weight of the acting pistons will nearly compensate the power required to carry the dead weight of the pistons over the contracting part of the inclined plane.

As the velocity of a body moving down an inclined plane is gradually accelerated, it would follow that the speed of the shaft S would be accelerated at each revolution. This is, however, not the case here, as the acceleration of motion resulting from one of the pistons traveling down an inclined plane on the one hand, and on the other the gradual increase of its weight, is exactly counterbalanced by the retarding effect of the piston or pistons traveling over the contracting part of the inclined plane, thus producing a perfectly uniform rotation.

In the ordinary steam-engine if the throttle or other valve in the boiler-pipe or the governor by accident fail to perform its functions when in a position in which too great a volume of steam will pass to the steam-chest, the piston will acquire a velocity that, unless immediately checked, will result in an accident to the machinery. This cannot take place in this engine, for the reason that when a certain speed has been attained the passage of the ports $d$ $d'$ $d^2$ over the steam-port F' will be sufficiently rapid to prevent that volume of steam which would result in a destructive or injurious speed to pass to the cylinders D D' D². The engine therefore acts as a governor under conditions when such is most desirable.

I have described that construction of my improved engine which I have found the most simple, economical, and durable, yet this construction may be greatly varied without departing from the nature of the invention. For instance, I have shown the engine as rotating in a vertical plane on a horizontal shaft. This order may be reversed, and the engine may be mounted on a vertical shaft to rotate in a horital plane, or the shaft may inclined at any desired angle, and the engine mounted thereon made to work equally well.

I have shown an engine having three pistons, two such pistons may be employed, though, as above set forth, the rotation would not be so uniform a one as with three pistons. The latter number may, however, be increased with very good effect.

Instead of employing one engine upon a driving-shaft, two or more may be employed. In propelling ships, for instance, two or more of the engines may be mounted on the paddle-wheel shaft at such points as to counterbalance, or nearly counterbalance, the paddle-wheels, and, as will be seen, that shaft will then be driven without intermediate gearing or cranks.

Instead of a solid piston, one of the usual form may be employed, or a hollow piston moving within or upon its cylinder.

Instead of providing each piston with a roller, the ends thereof may be rounded off, so as to slip from under the band, though in this case there would necessarily be a greater amount of wear, and the use of the rollers is therefore to be preferred.

The connection between the boiler and exhaust-pipes and the steam-chest may be made at the end of the chest, as shown in Fig. 6, or, as shown in Fig. 3, at opposite sides.

That part of the steam-chest which projects from its casing D³ need not be cylindrical. It may have any other form, and, as shown in Fig. 6, it may be made to perform the function of the packing gland or nut N.

In Fig. 1 I have shown a screw-shaft for adjusting the ring A horizontally. This may be effected by a worm-shaft and pinion or by providing one of the arms $a$ of the ring A with teeth on its upper or under side to mesh with a suitable cog-wheel.

Instead of adjusting the ring A horizontally, it may be adjusted vertically, and in practice I make it adjustable both vertically and horizontally by providing suitable bearing-boxes adapted for such adjustment in a manner similar to that usually employed for adjusting shafting.

The steam-chest is or may be provided with a hand-lever, L, by means of which the chest can be rotated upon the shaft so as to change the position of its feed and exhaust ports. This is of the greatest importance when the ring is adjusted both vertically and horizontally, in which case the position of the inclined planes formed by the inner periphery of the ring will be changed relatively to the position of the feed and exhaust ports of the steam-chest.

It will be seen that if the center of the ring A is displaced horizontally, as shown in dotted lines, Fig. 1, and in the plane of the axis of the shaft S, thus shifting the inclined planes horizontally only, the relative position of the latter and the ports $F'$ $F^2$ will not be disturbed; but if the ring is adjusted both vertically and horizontally this relative position of the planes and valve-ports is disturbed, so that it will be necessary to correspondingly shift the steam-chest to admit steam to the pistons when they are entering upon the receding half of the inclined plane, and exhaust it when they are entering upon the contracting half of said plane. In other words, if the position of the inclined planes is changed it is necessary to correspondingly change the position of the feed and exhaust ports; otherwise the steam will be admitted to the cylinders when the pistons are yet traveling over the contracting half of the inclined plane, and exhausted therefrom while yet traveling over the receding half of said plane. The importance of this adjustment will be evident when more than one engine are employed upon the same shaft. In this case the rings of the several engines may be so arranged around the shaft that the receding half of one inclined plane will commence where the receding half of the other terminates or the contracting half commences. In this manner the several inclined planes of the engines will form a continuous receding inclined plane around the shaft, the piston-cylinders of one engine receiving steam when the steam of those of the others is exhausted.

When a series of engines are employed upon the same shaft their rings and valve-chests may be arranged relatively to one another so that the piston-cylinders of the second will receive steam before the steam is exhausted from the cylinders of the first, and the piston-cylinders of the third will receive steam before the steam is exhausted from the cylinders of the second, and so on.

The lever L may be locked in proper position by any suitable means—such as a toothed sector—and means may be provided indicating the position the lever has to be in to adjust the valves to correspond with the change in the position of the inclined planes. I have found that these adjustments are necessary to adapt the engine to work in any position and to regulate its speed or reverse its motion, and, owing to the fact that the contracting portion of the ring will not be subjected to as much wear as the receding portion thereof, by adjusting the ring horizontally and vertically, and the steam-chest correspondingly around the shaft, the working-surface of the inclined plane will be shifted relatively to the axis of the pistons, and thus the entire surface of the plane may be subjected to equal wear. It will also be seen that that part of the inclined plane which approaches the shaft is employed simply to return the pistons into their cylinders. This may, however, be effected by spring-power or by providing means to force the piston back by steam-power, and the exhaust-steam may be advantageously employed for this purpose, and the contracting part or half of the inclined plane may be thus dispensed with.

An oil-cup, O, on top of the ring A, may be employed to lubricate the inner periphery thereof, and if said ring is in a horizontal position it may be located at any convenient point.

Instead of lubricating the band, it will, however, be found more advantageous to lubricate the rollers, and this may be effected by forming an oil-chamber within the pistons and providing a delivery-tube to deliver the oil from the chamber to the roller-surface. It will be readily seen that in this case the oil will be delivered to the rollers intermittingly, and only at such times when the piston is in a position to allow the oil to flow through the tube, and a waste of oil is thus avoided.

Having now described my invention, what I claim is—

1. The horizontally and vertically adjustable ring A, the shaft S, the cylinder E, pistons P $P'$ $P^2$, and means to convey steam to and exhaust it from the cylinders of the pistons, all combined substantially as and for the purposes described.

2. The combination, with the shaft S and the cylinder E, rigidly mounted on the shaft, of the steam-chest F, loosely mounted on said shaft, and an adjustable gland or nut, whereby the steam-chest in any required position around the shaft may be tightened up to the port-face of the cylinder to compensate for the wear, substantially as described.

3. The combination, with the adjustable ring A, the shaft S, and the cylinder E, of the steam-chest F, adjustable around the shaft, whereby the admission and exhaust of steam may be adjusted to correspond with the adjustment of the ring, substantially as and for the purposes described.

4. The combination, with the adjustable ring A, the shaft S, and the cylinder E, having pistons P P' P² and steam-ports $d\ d'\ d^2$, of the adjustable steam-chest F, having live and exhaust steam passages $f f'$ and ports F' F², combined and operating substantially as and for the purposes described.

5. In a steam-engine of the class described, the method of subjecting the entire surface of the plane of resistance to equal wear by adjusting the same both horizontally and vertically relatively to the axis of rotation of the forces acting upon said plane, and correspondingly adjusting the admission and the exhaust of the power impelling said forces, whereby the position of the working-surface of the plane of resistance is shifted relatively to the forces acting thereon, substantially as described.

JAMES A. ADAMS.

Witnesses:
  T. W. CHANDLER,
  R. M. RUSSELL.